Dec. 7, 1943.   J. MIHALYI   2,336,278
FILM WINDING APPARATUS
Filed Feb. 13, 1942
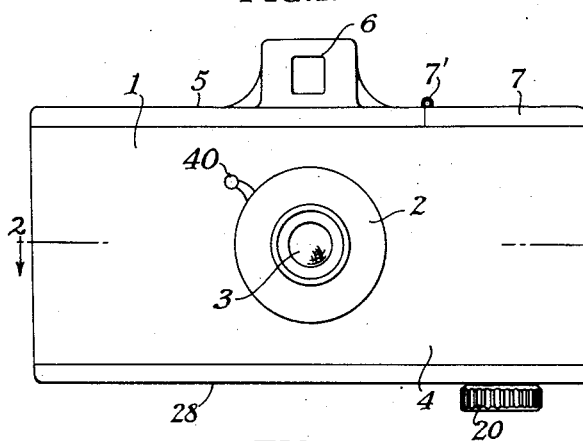
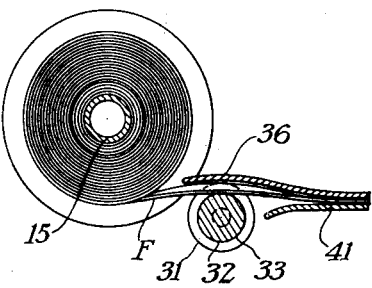
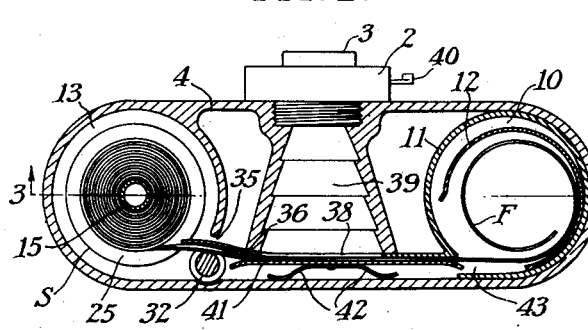
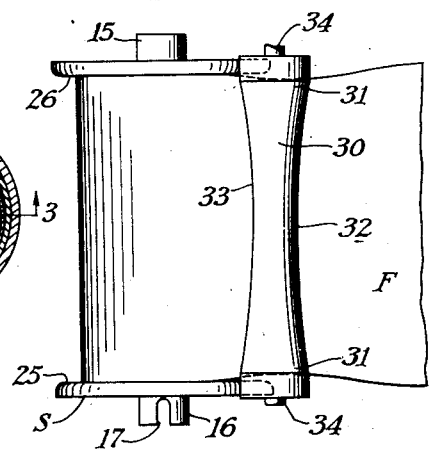
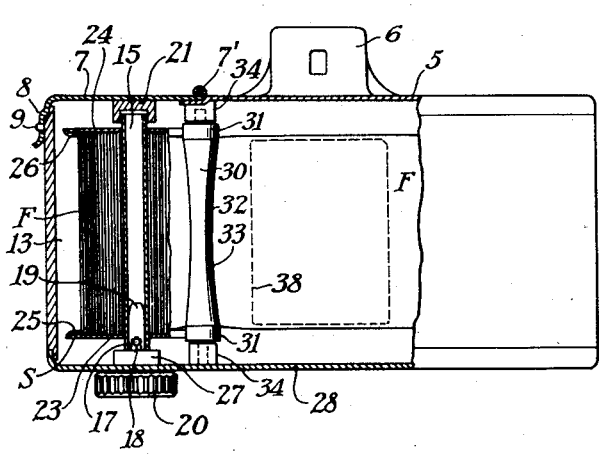
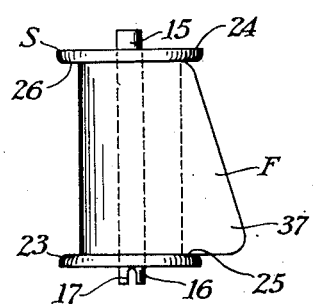
JOSEPH MIHALYI
INVENTOR
BY
ATTORNEYS Patented Dec. 7, 1943

2,336,278

UNITED STATES PATENT OFFICE 2,336,278

FILM WINDING APPARATUS

Joseph Mihalyi, Rochester, N. Y., assignor to Eastman Kodak Company, Rochester, N. Y., a corporation of New Jersey Application February 13, 1942, Serial No. 430,789

6 Claims. (Cl. 95—31)

This invention relates to photography and more particularly to photographic apparatus designed for use with roll film. One object of my invention is to provide a film winding device in which a roll of film can be loaded into the apparatus by merely dropping the roll into a suitable chamber. After loading, the film may be passed through the apparatus and returned to the original roll, thus expediting the loading operation. Another object of my invention is to provide a simplified roll of film which is inexpensive to manufacture and which will hold the film in a light-tight condition. Another object of my invention is to provide a means for quickly and easily directing the film through the apparatus in which it is used. Still another object is to greatly simplify not only the photographic apparatus in which the spool is used, but also the operations necessary in using such apparatus. Other objects will appear from the following specification, the novel features being particularly pointed out in the claims at the end thereof.

Coming now to the drawing wherein like reference characters denote like parts throughout:

Fig. 1 is a front elevation of a simplified camera adapted to utilize my improved type of film winding apparatus;

Fig. 2 is a section taken on line 2—2 of Fig. 1;

Fig. 3 is a section taken on line 3—3 of Fig. 2;

Fig. 4 is an enlarged fragmentary sectional view of a portion of the film winding apparatus;

Fig. 5 is an enlarged side elevation of a portion of the film winding apparatus; and Fig. 6 is a side elevation of a typical film cartridge adapted to be used in photographic apparatus.

Broadly speaking, my improved film winding apparatus may consist of a means for directing an end of a film through photographic apparatus—such as a camera or a projector—after a spool of film is loaded into a single spool chamber. The film may be passed through the apparatus past an exposure frame and then returned to the original spool which may be removed from the single spool chamber. While this film winding mechanism was designed primarily for cameras or projectors, and particularly cameras or projectors utilizing small sizes of film, it is also quite useful in printing or enlarging machines where it is desirable to rapidly and accurately position various films in a gate for exposure.

As applied to a camera, the camera may consist of a camera body 1 having a shutter 2 supporting an objective 3 on a front wall 4 of the camera in the usual manner. The top wall 5 may carry a standard finder 6 and may be provided with a hinge 7' which permits an end section 7 when the latch 8 is released from the pin 9 to swing upwardly to expose a film chamber 13.

A take-up film chamber 10, as indicated in Fig. 2, may include a substantially cylindrical housing 11 in which there is a loose curved leaf spring 12 adapted to assist the end of the film F in coiling up when the film is propelled into the spool chamber 10 from a supply chamber 13. The supply chamber 13 is normally covered by the hinged section 7, but when this section is unlatched a spool designated broadly as S of film F may be inserted axially into the supply chamber 13.

Referring to Fig. 6, the film spool may comprise a hub member 15 having a trunnion 16 at one end provided with a cross slot 17 adapted to engage a pin 18 of a winding shaft 19 connected to a winding knob 20. Thus, when the film spool S is dropped into the spool chamber, it rides on the pin 18 until the slot 17 is seated on the cross pin 18, thus positioning the film spool in a winding position. When the cover 7 is lowered, the bearing 21 engages the upstanding trunnion 16 to hold the film spool in its winding position.

Where the film spool is to be used in a camera it is unnecessary to provide the usual backing paper because the sensitive surface of the film is protected against light by an opaque or substantially opaque backing on the film of any known type. The inner end of the film is preferably attached to the film hub 15.

As also indicated in Fig. 3 the spool flanges 23 and 24 are provided with rim portions 25 and 26 which are spaced together a distance closer than the total width of the film F. These flanges may be made of thin metal which is rigid or, if desired, which is slightly springy. The flanges 25 and 26 will normally hold the film against unwinding as indicated in Fig. 6, but if the film is bowed transversely the film may be unwound from or wound on the film spool S according to the direction of rotation of the knob 20 which has a frictional contact with a bearing 27 carried by the bottom camera wall 28.

In order to curve the film transversely so that it may pass freely between the flanged edges 25 and 26, I provide a guide member adjacent the film spool and preferably in the form of a roller 30 having the ends 31 of the roller of a larger diameter at the ends than at a point intermediate the ends at 32. The amount of this difference is not critical but preferably is in the order of one third larger at the ends than at the center thereof. Thus, there is a curved wall 33 with which the film F may contact which will curve the film transversely and permit it to be moved through the photographic apparatus. The roller 30 may turn on suitable trunnions 34.

The cylindrical spool chamber 13 is provided with an opening 35 through which a curved guide plate 36 passes so that, when the film spool S is turned, the end 37, as indicated in Fig. 6, may come in contact with the plate 36 and cause the film to contact with the roller 30 bowing it transversely as indicated in Fig. 5 so that the film F may be moved through the camera. The plate 36 is provided with the usual exposure aperture 38 through which an exposure is made, the light entering the cone 39 of the camera through the objective 3 when a trigger 40 on the shutter is depressed to make an exposure.

In order to hold the film flat in the exposure frame, there may be a presser member 41 spring pressed by leaf springs 42 to hold the film in an exposure position. This plate also guides the film after it passes over the curved surface 33 of the film roller.

The plates 36 and 41 extend to an opening 43 in the take-up spool chamber 10 so that as the winding knob 20 is turned the film will be coiled up into the take-up film chamber and may be guided in the coiling operation by means of a leaf spring 12.

With a camera constructed as above described the operations of loading the camera, making exposures, and unloading the camera are extremely simple. To load, the door 7 is swung open and a spool S of film is placed in the spool chamber 13 with the slot 17 of trunnion 16 engaging the winding pin 18. The cover is then snapped closed. The operator does not need to pay any attention to the position of the film end 37 since, as soon as he turns the knob 20 in the winding direction, the end will engage the curved end 36 of the guide plate and, through its engagement with the curved edge 33 of roller 30, will bow the film transversely so that it may pass freely past the exposure frame 38 and into the spool chamber 10. Exposures may be made on the film as it is moved toward the spool chamber 10 or, if desired, the film may be completely unwound into the spool chamber 10 after which exposures may be made by rewinding the film back onto the film spool. In either case it is desirable to have some automatic means of measuring the film, rather than the usual type of red window, such automatic film measuring means being well known.

After the film has been exposed and rewound upon the spool S, the operator opens the door 7 and can readily remove the exposed film spool either by lifting it out of the spool chamber 13 or turning the camera over so that it will slide out.

While I have described a preferred embodiment of my invention consisting of a camera, it is obvious that it may be equally desirable to move exposed film through a projector, a printer or an enlarging device of the same type winding and reeling mechanism which employs the curved film guide to direct film to and from flanges which normally hold the film on a reel from unwinding.

What I claim and desire to be secured by Letters Patent of the United States is:

1. Photographic apparatus for use with roll film including, in combination, a body, an exposure frame therein, a spool chamber adjacent the exposure frame, a film roller having different diameters at the ends than at the center thereof positioned between the exposure frame and the spool chamber, the shape of the roller being such that a film may be bent transversely of the film to reduce the distance between the lateral edges thereof as it passes over the film roller.

2. Photographic apparatus for use with roll film including, in combination, a body, an exposure frame therein, a spool chamber adjacent the exposure frame, a film roller rotatably mounted between the exposure frame and spool chamber, said roller having a smooth and continuous film contacting periphery and of materially larger diameter at the ends than intermediate the ends thereof.

3. Photographic apparatus for use with roll film including, in combination, a body, an exposure frame therein, a spool chamber adjacent the exposure frame, a curved film guiding means mounted between the spool chamber and the exposure frame for curving a film laterally when passing between the spool chamber and the exposure frame, and a film winding member for moving the film over the curved film guiding means for curving the film transversely.

4. In photographic apparatus comprising a body having, in combination an exposure frame, a spool chamber adjacent the exposure frame, a guide roller between the exposure frame and spool chamber, a film guiding plate extending from the exposure frame to the roller, a second film guiding plate leading from the spool chamber to the roller whereby a film may be guided into the exposure frame from the spool chamber, said roller having a greater diameter at the ends thereof than between the ends for transversely curving a film as it passes over the roller.

5. In photographic apparatus comprising a body having in combination an exposure frame, a spool chamber adjacent the exposure frame, a guide roller between the exposure frame and spool chamber, a film guiding plate extending from the exposure frame to the roller, a second film guiding plate leading from the spool chamber to the roller whereby a film may be guided into the exposure frame from the spool chamber, said roller having a diameter at the ends thereof one third larger than the diameter of the roller between the ends thereof for curving film passing between the spool chamber and exposure frame transversely of its length.

6. In photographic apparatus adapted for use with roll film spooled on spools the flange edges of which are closer together than the width of the film, the combination with an exposure frame, of film chambers on each side of the exposure frame, a winding key for turning a film spool in the supply chamber, and a concave film roller mounted adjacent one spool chamber and the exposure frame for curving said film transversely whereby said film may pass between the narrow edges of said film spool.

JOSEPH MIHALYI.